July 3, 1951  O. JENSEN  2,559,216
CIRCUIT MAKER
Filed April 20, 1945  5 Sheets-Sheet 1

INVENTOR.
OTTO JENSEN
BY Ostrolenk + Faber
ATTORNEYS

July 3, 1951  O. JENSEN  2,559,216
CIRCUIT MAKER
Filed April 20, 1945  5 Sheets-Sheet 3

INVENTOR.
OTTO JENSEN
BY
Ostrolenk & Faber
ATTORNEYS

INVENTOR.
OTTO JENSEN
BY
Ostrolenk + Faber
ATTORNEYS

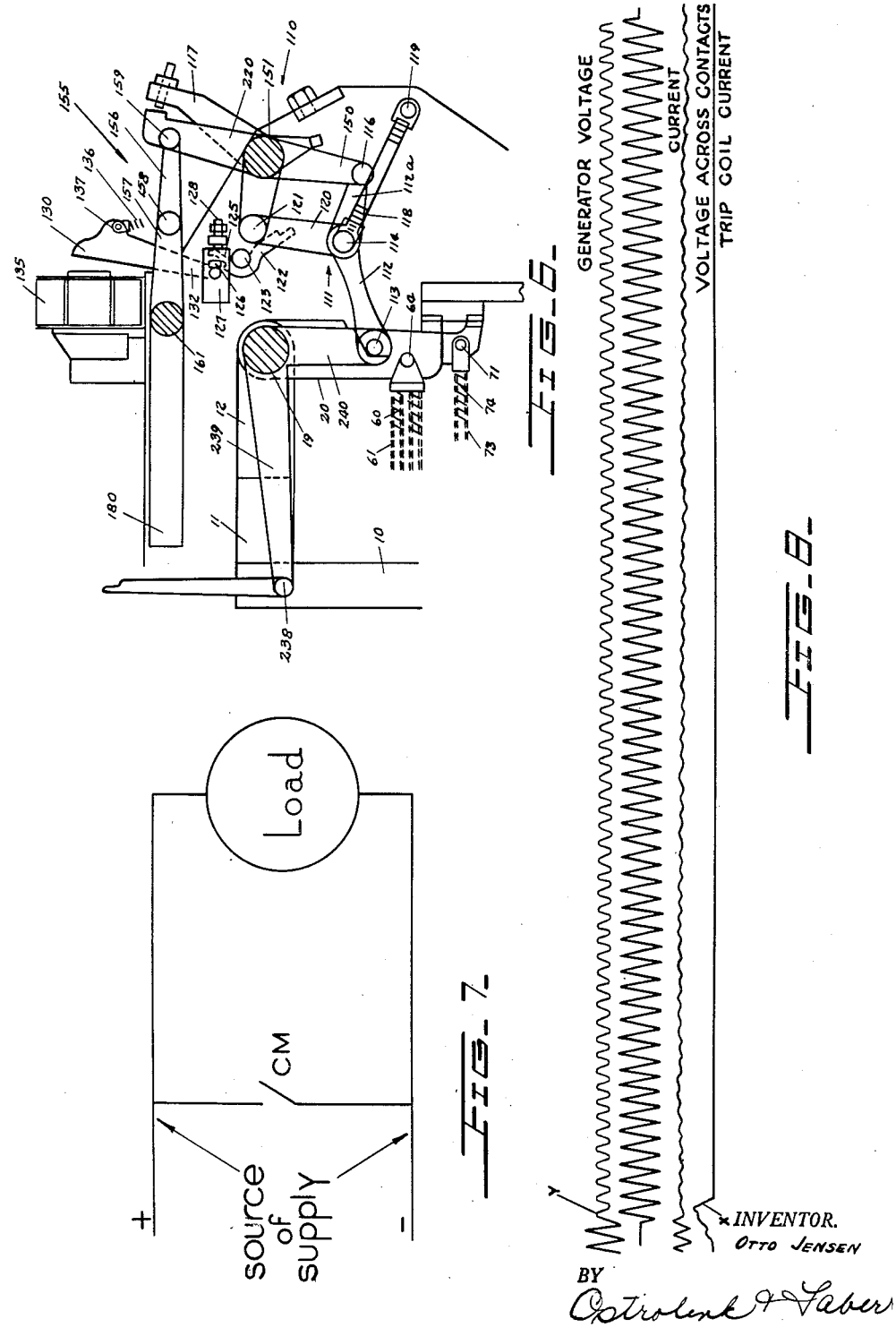

Patented July 3, 1951

2,559,216

UNITED STATES PATENT OFFICE 2,559,216

CIRCUIT MAKER

Otto Jensen, Malvern, Pa., assignor to I. T. E. Circuit Breaker Company, Philadelphia, Pa., a corporation of Pennsylvania Application April 20, 1945, Serial No. 589,344

1 Claim. (Cl. 200—87)

My present invention relates to switchgear, and more particularly to a circuit maker designed to close a circuit rapidly on the occurrence of predetermined conditions.

The usual form which a quick operating switch takes is that of a circuit breaker in which the problem is to open the circuit as quickly as possible when a high fault current occurs.

In the present invention, the problem is reversed, that is, the quick operating switch is designed to close a circuit on the occurrence of high fault current.

Essentially my device is designed for use in connection with a circuit interrupter to provide a discharge path for high reactive loads or to short circuit the generator or similar device which has its field cut off. Thus, where the circuit to a large magnet is interrupted, the high reactance of the load may cause an excessive voltage rise owing to the sudden interruption. The operation of my circuit maker to close the circuit across this load and to provide a discharge path for the current ensures that the entire circuit will not be subject to the disruptive forces of this excessive voltage rise. My novel circuit maker may thus be used to provide a by-pass circuit to discharge this current or to introduce a resistance to reduce the momentary voltage rise.

In the usual circuit breaker, the contact is a movable member bridging two studs, and the electric circuit within the circuit breaker is preferably U-shaped, with the contacts so spaced and shaped that the magnetic field due to very high currents tends to blow the circuit breaker open thereby speeding the opening of the circuit breaker. In the case of my novel circuit maker, the exact reverse of this type of operation is required; it is desirable to close the circuit maker on very high values of current. The values of currents for which the novel devices according to my invention have been designed are 30,000 amperes, 100,000 amperes and 200,000 amperes.

In order to be able to close the contacts of my device under these very high currents, I have found that best results are achieved by the novel expedient of forming the electrical circuit loop so that the contacts will be driven at all times to the closed position under the influence of the magnetic field created by the very high current. To this end, the electrical circuit within my novel circuit maker is so designed that the contacts operate on the inside of the loop.

The circuit maker is normally in the open position and is held in that position by a latch. It is biased toward the closed position by heavy springs acting directly on the contacts. The direct acting spring pressure on the contacts combined with the positioning of the contacts on the inside of the current loop provides a very fast closure.

Essentially, therefore, my circuit maker is a switch which is normally latched open and is subject to continuous biasing pressure tending to close it. The operation of a trip coil releasing the latch will permit the biasing means to effect a rapid closure of the circuit maker.

Accordingly, a primary object of my invention is the provision of switchgear which is biased toward circuit closing position but which is normally latched open.

Another object of my invention is the provision of a circuit maker which will close a circuit at high speed in response to predetermined current conditions.

Still another object of my invention is the provision of a circuit maker so arranged that the contacts are under direct biasing pressure tending to close them.

A further object of my invention is the arrangement of the electrical connections and contacts of the circuit maker in such a manner as to form a current loop tending to blow the contacts together.

These and many other objects of my invention will become apparent in the following description and drawings in which:

Figure 6 is a schematic view corresponding to Figure 1 showing the contacts once more in the tripped position of Figure 1.

Figure 7 is a schematic circuit diagram showing the manner in which my novel circuit maker may be used.

Figure 8 is an oscillogram demonstrating the operation of my novel circuit maker.

Figure 1:
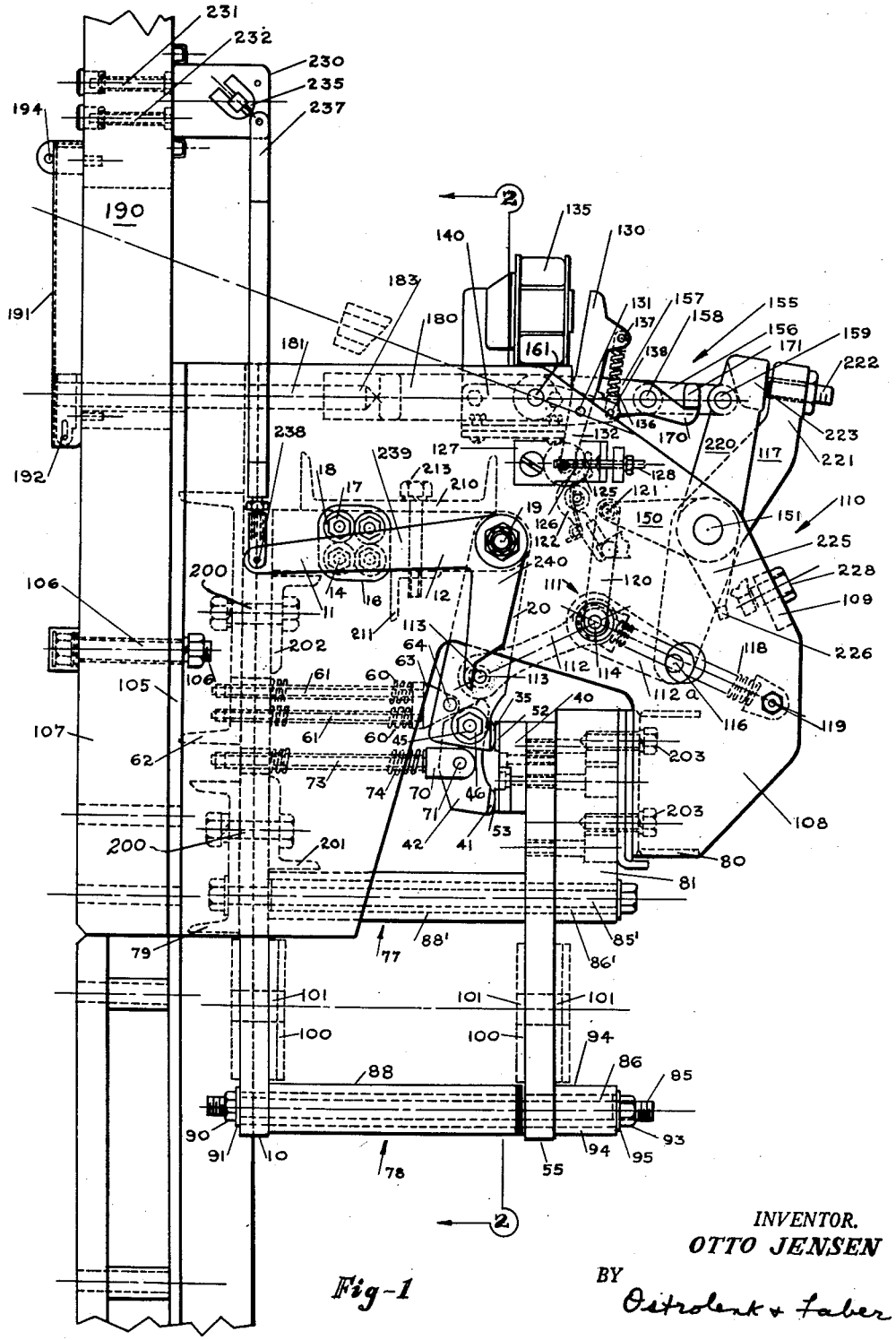
Figure 1 is a side view of my novel circuit maker showing the contacts tripped closed and before a resetting operation has taken place preparatory to reopening the circuit maker.
Figure 3:
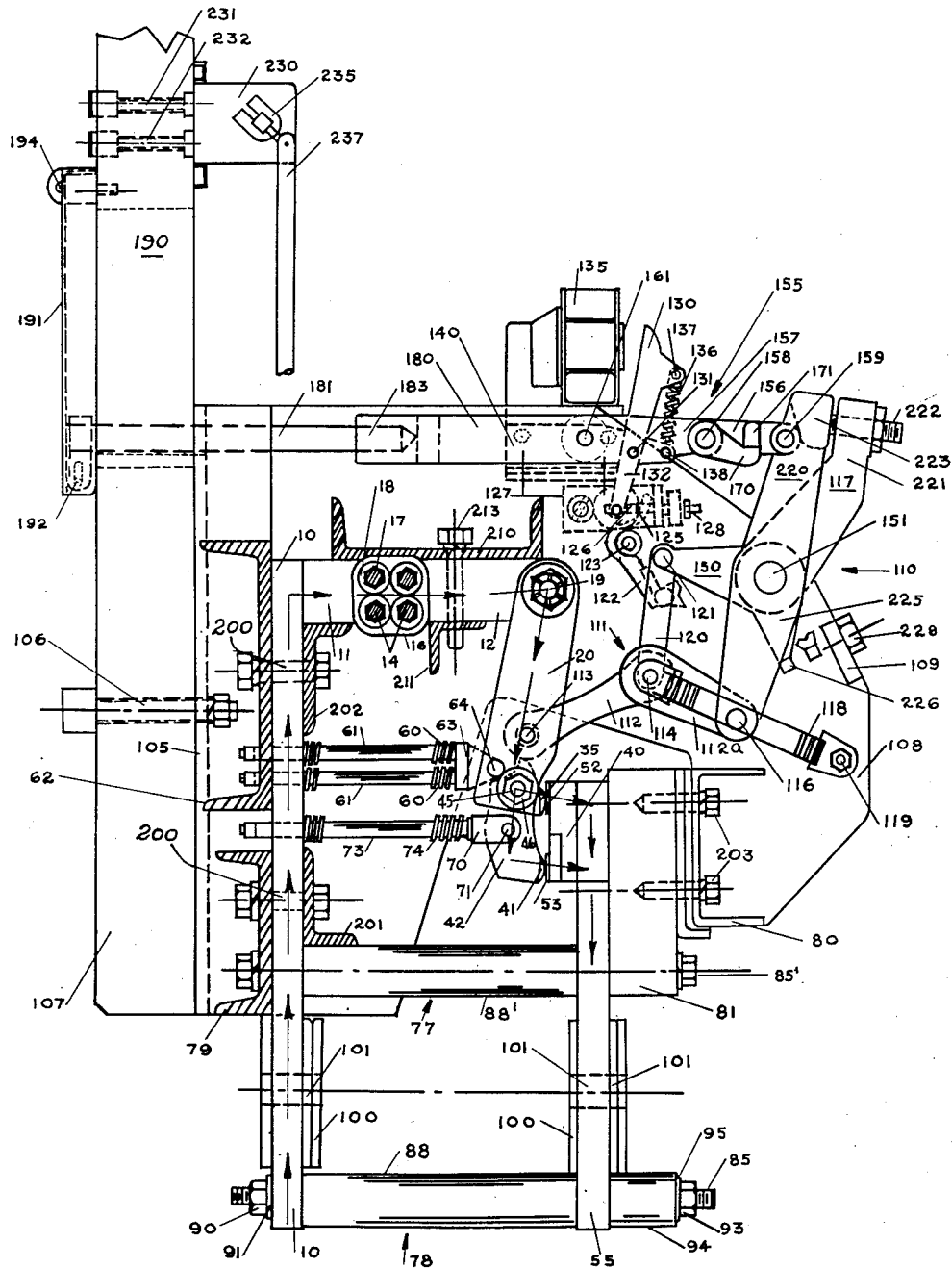
Figure 3 is a side view corresponding to that of Figure 1 with the side cover removed showing the elements of the circuit maker in the same position as that of Figure 1.

Referring now to Figures 1, 3 and 6, the circuit maker is here shown in the tripped position where the contacts have been tripped closed and before the link mechanisms have been re-set preparatory to a circuit opening operation.

Current enters the circuit maker through the connection bar 10 and passes up to the connecting block 11, which is secured thereto in any suitable manner. The connecting block 11 is provided with a plurality of grooves in which are secured the connection studs 12, 12 (see also Figure 3).

The connection studs 12, 12 are held in appropriate position in the grooves by a plurality of bolts 14, 14 passing through the connecting block 11 in the grooved area thereof and the connecting studs 12 carried in those grooves. The bolts also pass through the outside tie-plates 16, one on each side, and are appropriately secured by nuts 17 and washers 18 on each side.

Pivot rod 19 passes through aligned openings in each of the connecting studs 12 and carries a plurality of pairs of contact arms 20 rotatably mounted thereon.

Figure 2:
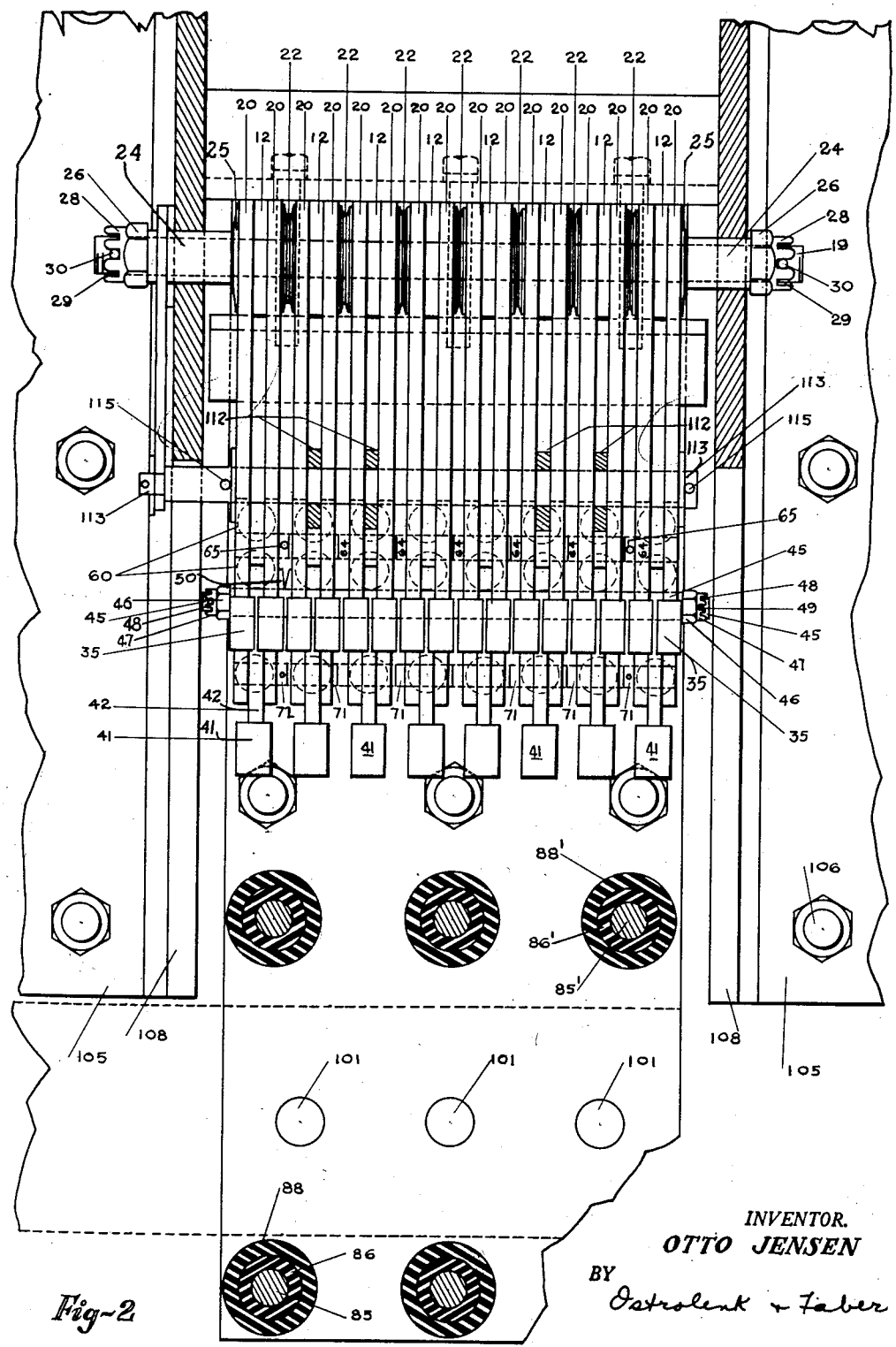
Figure 2 is a front view, partly in section, taken from line 2—2 of Figure 1 looking in the direction of the arrows.

Each pair of contact arms 20, as is seen in Figure 2, is mounted on opposite sides of a connecting stud 12. The sides of the contact arms 20 are forced into close current carrying engagement with the respective connecting studs 12 with which they cooperate by the spring washers 22 between each pair of connecting arms 20.

The entire assembly is forced into tight current carrying engagement by bushings 24—24 mounted on each end of the pivoting rod 19 and forced against the spring washers 25, 25 by nuts 26, 26. Each of the nuts 26 has a locking extension 28 extending outwardly therefrom provided with a plurality of grooves 29, 29. Cotter pin 30, passed through an opening in each end of the rod 19, passes through a pair of opposite grooves 29 in the locking extension 28 and prevents the nuts 26 from rotating to loosen the established current carrying connection.

Each of the contact carrying members 20 carries an individual main contact 35 secured thereto in any appropriate current conducting manner. As is seen in Figure 2, each of the contacts 35 is wider than the contact carrying arm 20 which carries it so that the contacts are spaced from each other by relatively small distances, and substantially the entire width of the stationary contact 40 is thus effectively used.

Secondary contacts 41 are each supported on secondary contact carrying arms 42, which in turn are each carried between respective pairs of main contact arms 20, 20, as is seen in Figure 2. The secondary contact arms 42 are each pivotally mounted on the rod 45 which pass through aligned openings in the upper ends of the arms 42 and corresponding openings in the lower ends of the arms 20.

The rod 45 is provided with a lock nut 46 corresponding exactly to the lock nut 26, above described in connection with rod 19, the said lock nut having an extension 47 with grooves 48 to receive the cotter pin 49 and to prevent the lock nut 46 from turning once it has been tightened.

Spring washers 50 are provided at the lower end of the contact arms 20 between pairs of contact arms 20 surrounding the rod 45 and pressing the pairs of contact arms 20 together at their lower ends to ensure an efficient current carrying condition between the lower ends of the contact arms 20 and the upper ends of the secondary contact arms 42.

The main contacts 35 and the secondary contacts 41 cooperate respectively with a longitudinal main contact member 52 and a longitudinal secondary contact member 53 on the stationary contact block 40. This arrangement of the movable main and secondary contacts provides for a degree of flexibility for the contact structure, so that if the stationary contacts or portions of the main contacts should become worn, the remaining contacts may adjust themselves to a limited degree to the slight variation from a planar condition.

The current then flows from the stationary contact block 40 to the opposite connecting member 55. It will thus be seen that within the circuit maker itself, a current loop is formed comprising the connecting member 10, the connecting block 11, the connecting studs 12, the contact arms 20 and 42, the contact block 40 and the connecting member 55.

It will also be seen that the contact arms 20—42 with the movable contact members 35 and 41 are pivotally mounted to swing inside the loop 10, 11, 12, 20, 40 and 55.

A contact blow-on effect is obtained by reason of the curve of the loop around the pivot point 19, and also by reason of the fact that the contact arm 20 must swing out in a direction toward the outside of the loop in order to close the contacts. In the ordinary quick acting circuit breaker, just the opposite effect is desired, and the contact arms are arranged so that they are pivoted to swing away from the loop when contact opening is desired, and they swing in to close up the loop during contact closing. Thus, in circuit breakers, a contact blow-off effect is desired and obtained.

In my novel circuit maker, the U-shaped electrical circuit with the contact members on the inside of the loop and swinging out during contact closing condition obtains a blow-on effect tending to reinforce the biasing means which closes the contacts of the circuit maker. By this combination of the biasing means for moving the contacts and the blow-on effect, an extremely rapid contact closing operation is obtained, and contact engagement is assured.

The biasing means comprises a plurality of compression springs 60, 60 guided by the rods 61, 61 which pass through appropriate openings in the connecting member 10 and the cross bracket 62. The rods 61, 61 are connected to the lugs 63—63, which in turn are pivotally connected to the cross rods 64—64 which pass through a plurality of aligned openings in the contact arms 20 (see also Figure 2).

The compression springs 60 bear against the left hand surface (Figure 3) of the lugs 63 at one end and against the right hand surface of connecting member 10 at the other end. These compression springs accordingly exert a strong bias on the contact arms 20 tending to rotate them in a counterclockwise direction to effect the closing of the circuit maker.

The secondary contact arms 42 are also provided with lugs 70 pivotally mounted on the rods 71—71 passing through aligned openings in the secondary contact arms 42.

Each lug 70 carries a guide rod 73 which passes through an opening in the connecting member 10. A compression spring 74 is mounted between the right hand surface of the connecting member 10 and the left hand surface of the lug 70 and thus independently biases the secondary contact arms 42 into circuit closing arrangement.

Each lug 63 supports a pair of compression springs 60—60 and guide rods 61—61. The lugs 63 are pivotally connected to each pair of main contact arms 20 through the individual cross rods 64—64 which are retained by the cotter pins 65—65.

This type of construction is used to secure even contact pressure throughout the width of the contact 40 since a solid rod would permit only the highest contact members 35 to exert proper pressure.

A similar construction is used for the same reason with the secondary contact arms 42, lugs 70—70 and the cross rods 71—71 retained by the cotter pins 72—72.

When the high currents, above mentioned, are passing through the connecting members 10 and 55, very high magnetic forces are provided tending to force the conducting members 10 and 55 apart owing to the loop shape of the circuit. For that reason it is necessary to place the conductors with respect to each other in a very rigid manner. Accordingly portions of the connecting members 10 and 55 that extend toward the bottom of the circuit maker as passed through balks 77, 78 which are insulated from the conductors, and the conductors are very rigidly mounted in a heavy frame. The conductor 10 is braced by the bracket 62 and the cross bracket 79, and the conductor 55 is braced by the cross bracket 80 and the insulating cross member 81.

The balks 77 and 78 each comprise a bolt 85, 85' having insulating sleeves 86—86' and mounted through aligned openings in the connecting members 10 and 55. An insulating bushing 88, 88' is mounted on the sleeve 86—86' of each bolt 85—85'.

Nut 90 is tightened on the bolt 85 against washer 91 which bears against the conducting member 10. Accordingly, the bolt 85 is at the potential of conducting member 10. The opposite end of the bolt 85 at nut 93 is completely insulated from the connecting member 55 by the extended bushing 94, so that nut 93 is tightened against washer 95 against the end of the bushing 94 and is thus electrically isolated from the conducting member 55.

At the upper bolt 85', the cross piece 81 of insulating material takes the place of the bushing 94 at the lower bolt 85. All of the mechanism may be at the potential of the connecting member 10. The connecting member 55 is insulated from the remainder of the mechanism by the bushing 94, the cross piece 81 of insulating material and the upper insulating bushing 88'.

Appropriate current connection may be made to the connecting members 10 and 55 by connectors 100 secured to the connecting members 10 and 55 in any suitable manner as, for instance, by bolts passing through the aligned openings 101.

The entire apparatus hereinbefore and hereinafter described is preferably mounted on a pair of vertical angle brackets 105 (Figure 2) which are secured in any suitable manner, as by the bolts 106, to the panel 107. The angle brackets 105 may be secured or may be integrated with side supporting panels 108 which are bridged at their outer end by the reinforcing support 109 to rigidify the structure, which is also bridged and rigidified by the main pivot rod 19 for the main contact arms, as well as by the brackets 62, 79, 202, 210, 211, 201, 80.

Figure 5:
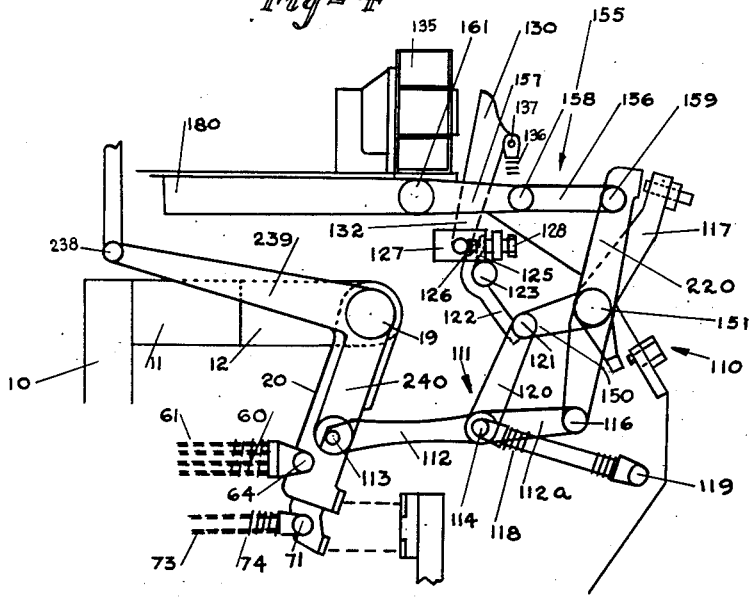
Figure 5 is a schematic view corresponding to that of Figure 4 showing the movement of the contacts from the Figure 4 position to the open circuit position.

Referring now to Figure 5, the contact arms 20 are retained in the open position against the bias of the compression springs 61 and 73 by the linkage system 110. The linkage system 110 comprises a main toggle 111 including links 112 and 112a connected by the center pin 114. The outer end of link 112 is pivotally connected to the rod 113 which passes through aligned openings in the main contact arms 20 and is secured in position by the cotter pins 115—115 (see also Figure 2). The outer end of link 112a on the opposite side is connected by the cross rod 116 to the operating arm 117.

In the open position of the circuit maker shown in Figure 5, the toggle 111 is just slightly above center so that it tends to collapse with the center pin 114 moving upwardly under the influence of springs 61 and 74. This upward collapse is, however, resisted by the latching link 120 which carries a latch engaging roller 121 engaging the latch member 122. Latch member 122 is secured to the rotatable support 123 carried between the side plates 108.

Latch member 122 has an upper extension 125 in the path of movement of the tripping bar 126. The tripping bar 126 is mounted in a pair of aligned horizontal slots in the opposite side plates 108 and is maintained in position by suitable cotter pins.

A side bracket 127 mounted on the outer surface of each of the plates 108 is provided with a matching slot for movement of the tripping bar 126 and with an adjustable stop member 128 to limit the movement of the tripping bar 126.

The trip bar 126 extends through to the outside of each of the side plates 108 where it may be engaged by suitable means and moved to tripping position.

An armature 130 is pivotally mounted at 131 on the outside of one of the side plates 108. The armature 130 has an extension 132 engageable with the left side of the tripper bar 126.

A magnet 135 in series with the circuit protected by the circuit maker is arranged so that when appropriately energized it will attract the armature 130. The armature 130 is biased away from the magnet 135 by the tension spring 136 which engages the armature 130 at the pin 137 and which, at its opposite end, engages a stationary lug 138.

The magnet and armature assembly with the spring 136 may be made as a single unit mounted on the bracket 140 securable to the outside of one of the plates 108 in a position where the lower extension 132 of the armature may engage the tripper bar 126 when the armature is attracted by the magnet 135.

When the magnet has been energized by appropriate current conditions to overcome the tension of spring 136 and attract the armature 130, the lower extension 132 of armature 130 will be rotated counterclockwise to bear against tripper bar 126 which in turn bears against the upper extension 125 of the latch member and rotates the latch 122 clockwise around its pivot 123 so that it will disengage the latching unit 121 on the latching link 120.

The latching end 121 of the latch link 120 is supported and guided by the guide link 150 which is pivotally mounted on the main pivot 151 around which the operating arm 117 rotates. The intermediate arm 220 is connected to the toggle 155 which comprises links 156 and 157 connected by the center pin 158. Link 156 is connected at the pivot 159 to the intermediate arm 220, while link 157 is rotatably connected to the stationary pivot 161 carried by the frame of the mechanism.

In the extended position of the toggle 155, the center pin 158 has moved slightly above center so that the toggle has a tendency to break upwardly. This upward breaking of the toggle on movement through center is prevented, however, by extension 170 of link 157 which bears against the underside of abutment 171 of link 156.

Figure 4:
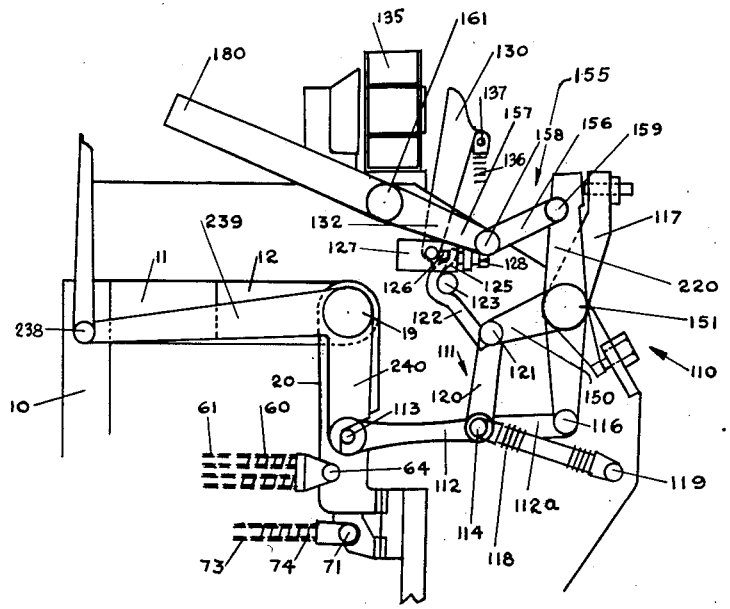
Figure 4 is a schematic view of the link mechanism of the circuit breaker of Figure 1 showing the circuit breaker trip closed and the link elements reset preparatory to a contact opening operation.

When the circuit maker trips from the position of Figure 5 to the position of Figures 1, 3 and 6, it is necessary to re-set the latches before the circuit maker can be opened once more. The latch re-setting operation is performed by a handle member 181 which engages with the extension 180 of toggle link 157. The handle, shown in dotted lines at 181 of Figures 3 and 1, is inserted in a socket 183 of the extension 180 of link 157. Lifting the handle, 181 raises the end 180 of the socket and depresses the center pin 158 of the toggle 155, breaking the toggle downwardly; this re-engages the latch member 122, as shown in Figure 4. Rotation of member 117 to relatch toggle 111 is assisted by tension spring 118 attached at one end to the center 114 of toggle 111 and at the other end to the lug 119 mounted on a stationary pivot.

Lowering the handle 181 lowers the end 180 of link 157, raising the center pin 158, and thus extending the toggle from the position shown in Figure 4 to the position shown in Figure 5; this results in clockwise rotation of arm 117 around its pivot 151 and consequently the movement of the pivot pin 114 to the left and movement of toggle 111 to the left with respect to Figures 4 and 5.

Since the latching link 120 is now engaged and held rigidly by the latch 122, the toggle 111 is supported and cannot break upwardly, and movement of the toggle 111 to the left opens the maker. On completion of the opening movement, the toggle 155 is broken slightly up through center, being prevented from collapsing upwardly by the blocking members 170 and 171, and the elements of the circuit maker are held in the open position preparatory to a tripping operation.

The handle 181 is inserted in the socket 183 through a slot 190 in the panel 107. Slot 190 is provided with a cover 191 which is pivotally mounted at 192 so that it may be swung down out of the way to permit the introduction of the handle 181. This cover 191 may be locked in position against unauthorized operation of the circuit maker by a padlock going through matching loops 194 on the panel 107 and on the cover 191.

The side frames 108 of the circuit maker are rigidly cross-braced by the cross braces 62, 80 and 109, as previously pointed out as well as by the cross brace 79, and 210. Cross braces 62 and 79 rigidly carry the connecting member 10 which is secured thereto by the bolts 200. Additional angle members 201 and 202 are also provided for rigidity. Similarly, for rigidification, the cross brace 80 is secured to the insulating block 81 by bolts 203, 203, and this block rigidly braces the connecting bar 55. The balks 77 and 78 rigidly space the connecting members 10 and 55 with respect to each other. The cross brace 210 and cross angle member 211 rigidly position the connecting block 11 and connecting elements 12 with respect to other elements of the circuit maker. Members 210 and 211 are interconnected with the connecting elements 11 and 12 by suitable bolts 213.

The operating arm 117 has an adjustable stop 222 which bears against the cross member 223 of the intermediate arm 220.

When the circuit maker is tripped and the toggle 111 collapses, the operating arm 117 is rotated in a clockwise direction while the intermediate arm 220 remains stationary. When the device is re-set by the clockwise rotation of the arm 180, the toggle 155 is broken downward (Fig. 4) and the intermediate arm 220 rotates counter-clockwise. This motion permits the operating arm 117 to straighten the toggle 111 and drop the latch engaging roller 121 under the latch member 122 from the position in Figure 6 to the position in Figure 4.

The toggle 111 is prevented from passing over center below the points 113 and 116 by the adjustment of the bell crank 225. The bell crank 225 is fastened to the toggle 111 through the latching link 120 and the pivot point 121. It is adjusted by the abutment 226 bearing against the adjustable stop 228.

My novel circuit maker may, of course, be provided with various control elements which integrate its operation with that of various other members. Thus, for instance, a control switch 230 may be mounted on the panel 107 having appropriate connections 231 and 232. The control switch is operated by a crank 235 which in turn is operated by the link 237 connected at 238 to the bell crank lever 239. The bell crank lever 239 is pivotally rotatable around an extension of the main contact arm pivot 19 and has an arm 240 which extends substantially parallel with the contact arm 20 and bears against an extension of the pivot rod 113. Consequently, any movement of the contact arm 20 about its pivot 19 results in corresponding rotation of the bell crank lever 239 about the pivot 19 and corresponding movement of the link 237 and actuation of the control switch 230.

In Figure 7 I have shown schematically one manner in which my novel circuit maker may be used where the source of supply is cut off either by failure of the source of supply or by the opening of a circuit breaker or by a short circuit.

The reactance of the load may damage elements of the load itself or of its connecting members. The circuit maker is so arranged, however, as previously described, that it will trip under the same conditions as will result in an opening of the current from the source of supply. The circuit maker, however, will trip closed under these conditions and will provide a by-pass for the voltage induced by the reactance of the load on cutting off of the source of supply. This by-pass will permit the necessary voltage drop to occur without damage to the winding of the load. The load, of course, need not necessarily be limited to an electric magnet, but any load which will tend to create a voltage of relatively high potential on instantaneous cutting off of the source of supply may be protected in the same manner. In addition, where circumstances and design require it, a resistance R may be inserted in series with the circuit maker to reduce the voltage on closing of the circuit maker.

In Figure 8, I have shown a reproduction of an oscillogram demonstrating the operation of my device. The bottom line shows the trip coil current, that is, the current in the principal circuit, not in the by-pass circuit. The second line from the bottom shows the voltage across the contacts of the circuit maker. The third line from the bottom shows the current across the contacts of the circuit maker; while the top line shows the generator voltage in the principal circuit. It will thus be seen that by the time the trip coil current (the current in the principal circuit) reaches a value X, the circuit maker contacts have closed (second line from bottom) and the voltage across the contacts of the circuit maker has dropped. At the same time, of course, as shown by the third line from the bottom, the flow of current across the contacts of the circuit maker is established and current flows until the discharge of the voltage across the load is completed. The trip coil current continues to rise beyond the point X until the arc of the circuit breaker which protects the source of supply is extinguished; this allows time for a drop in the generator voltage as shown at Y of Figure 8. The oscillogram here shown shows a return to voltage zero within 76 cycles or less than 1.3 seconds.

In the foregoing, I have described my invention only in connection with a specific preferred embodiment thereof. Many variations and modifications of my invention should now be obvious to those skilled in the art. Accordingly, I prefer to be bound not by the specific disclosures herein but only by the appended claim.

I claim:

In a circuit maker having a fixed contact and a movable contact, said movable contact being movable with respect to the other, a main movable arm carrying said movable contact and having a first position in which said contacts engage and having a second position in which said contacts disengage, said main movable arm being movable from its second to its first position, studs providing a current path to said movable arm and its contact and to the other of said contacts, said current path from one of said studs to said arm and through the other contact to the other stud forming a loop circuit, said movable arm in its contact open position being within said loop and having a path of movement about its fixed pivot when moving from its contact open to its contact engaging position, which path of movement is continuously within said loop and toward completion of said loop and a closing mechanism for applying a force for moving said movable arm in a direction from the second contact disengaged position within said loop toward the first contact engaging position at said loop, the magnetic forces on said main movable arm, due to the current flowing in said circuit maker, on engagement of said contacts being in the direction to drive said main arm toward said loop completion position and in the same direction as the forces of said closing mechanism which together with the magnetic forces are acting simultaneously to maintain the movable arm in contact engaging position.

OTTO JENSEN.

REFERENCES CITED

The following references are of record in the file of this patent:

UNITED STATES PATENTS

| Number | Name | Date |
| --- | --- | --- |
| 494,608 | Van Denburgh | Apr. 4, 1893 |
| 771,307 | Hewlett | Oct. 4, 1904 |
| 806,318 | Burnham | Dec. 5, 1905 |
| 808,371 | Horry | Dec. 26, 1905 |
| 1,216,867 | Smith | Feb. 20, 1917 |
| 1,310,353 | Kovacs | July 15, 1919 |
| 1,727,631 | Bruhlmann | Sept. 10, 1929 |
| 1,854,990 | Hilliard | Apr. 19, 1932 |
| 2,127,813 | Graves | Aug. 23, 1938 |
| 2,275,891 | Cox et al. | Mar. 10, 1942 |
| 2,283,748 | Mathieu | May 19, 1942 |
| 2,329,003 | Seaman | Sept. 7, 1943 |

FOREIGN PATENTS

| Number | Country | Date |
| --- | --- | --- |
| 322,057 | France | June 13, 1902 |
| 11,168 | Great Britain | May 14, 1904 |
| 442,763 | Germany | Apr. 8, 1927 |
| 473,336 | Germany | Mar. 14, 1929 |